US012606448B2

(12) United States Patent (10) Patent No.: US 12,606,448 B2
Takaesu et al. (45) Date of Patent: Apr. 21, 2026

(54) ANTI-VIBRATION MATERIAL

(71) Applicant: HONDA MOTOR CO., LTD., Tokyo (JP)

(72) Inventors: Keita Takaesu, Tokyo (JP); Seiji Hayakawa, Tokyo (JP); Naoki Sogawa, Tokyo (JP); Hiroki Kuwahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 472 days.

(21) Appl. No.: 18/167,891

(22) Filed: Feb. 13, 2023

(65) Prior Publication Data

US 2023/0322565 A1 Oct. 12, 2023

(30) Foreign Application Priority Data

Mar. 22, 2022 (CN) .......................... 202210288555.5

(51) Int. Cl.
| | |
|---|---|
| *C01B 33/40* | (2006.01) |
| *B60K 5/12* | (2006.01) |
| *F16F 1/36* | (2006.01) |

(52) U.S. Cl.
CPC ............ *C01B 33/40* (2013.01); *B60K 5/1208* (2013.01); *F16F 1/3605* (2013.01)

(58) Field of Classification Search
CPC ....... B60K 5/1208; C01B 33/40; C04B 30/00; C04B 14/10; C04B 2111/2046; F16F 1/3605; F16F 2228/001; F16F 7/00
See application file for complete search history.

(56) References Cited

U.S. PATENT DOCUMENTS

| | | | |
|---|---|---|---|
| 10,822,274 B1 * | 11/2020 | Hiremath ................ C04B 14/18 |
| 2008/0224087 A1 * | 9/2008 | Ezell ..................... E21B 36/003 |
| | | | 252/62 |
| 2015/0274899 A1 | 10/2015 | Kudo et al. |
| 2016/0272806 A1 | 9/2016 | Kudo et al. |
| 2017/0009024 A1 | 1/2017 | Kudo |

FOREIGN PATENT DOCUMENTS

| | | | |
|---|---|---|---|
| CN | 105980042 A | 9/2016 | |
| CN | 106189552 A * | 12/2016 | |
| CN | 107987567 A * | 5/2018 | |
| GB | 1194158 A * | 6/1970 | ............. C04B 28/24 |
| JP | S62113932 A | 5/1987 | |
| JP | H11166032 A | 6/1999 | |
| JP | 3728984 B2 | 12/2005 | |
| JP | 2006028446 A | 2/2006 | |
| JP | 6596791 B2 | 10/2019 | |
| KR | 10-0790426 B1 * | 1/2008 | |

OTHER PUBLICATIONS

Office Action issued Jan. 16, 2026 in the CN Patent Application No. 202210288555.5.

* cited by examiner

*Primary Examiner* — Anthony J Green
(74) *Attorney, Agent, or Firm* — CKC & Partners Co., LLC

(57) ABSTRACT

An anti-vibration material used in an engine mount is provided to include: a clay mineral; and a solvent, the solvent containing water and a polyhydric alcohol having a molecular weight of 106 or less, wherein the solvent has a polyhydric alcohol content of 35% by mass or more and 55% by mass or less.

1 Claim, 3 Drawing Sheets

ANTI-VIBRATION MATERIAL

This application is based on and claims the benefit of priority from Chinese Patent Application No. CN202210288555.5, filed on 22 Mar. 2022, the content of which is incorporated herein by reference.

BACKGROUND OF THE INVENTION

Field of the Invention

The present invention relates to an anti-vibration material used in engine mounts.

Related Art

In recent years, efforts to provide access to sustainable transportation systems designed in consideration of vulnerable people, such as the elderly and children, among traffic participants have been gaining momentum. For example, an anti-vibration material is encapsulated in an engine mount, thereby reducing the transfer of vibration and noise to occupants (see Japanese Patent No. 3728984). This configuration improves the livability of automobiles and thus further makes traffic safety and convenience much better.

Meanwhile, there are known hydrogel-forming compositions capable of forming hydrogels having self-supporting properties (see Japanese Patent No. 6596791). Here, a hydrogel composition contains a water-soluble organic polymer (A) having an organic acid structure, an organic acid salt structure, or an organic acid anion structure, a silicate (B), a dispersant (C) for the silicate (B), and a compound (D) having or producing two or more positive charges. The hydrogel composition may further contain a hydrous alcohol and a hydrous polyhydric alcohol. An example of the silicate (B) is smectite.

Patent Document 1: Japanese Patent No. 3728984
Patent Document 2: Japanese Patent No. 6596791

SUMMARY OF THE INVENTION

However, the anti-vibration material used in engine mounts is desired to have excellent high-temperature durability and dispersibility.

It is an object of the present invention to provide an anti-vibration material having excellent high-temperature durability and dispersibility.

According to one aspect of the present invention, an anti-vibration material used in an engine mount includes: a clay mineral; and a solvent, the solvent containing water and a polyhydric alcohol having a molecular weight of 106 or less, wherein the solvent has a polyhydric alcohol content of 35% by mass or more and 55% by mass or less.

The solvent may have a polyhydric alcohol content of 45% by mass or more and 55% by mass or less.

The clay mineral may be hectorite or stevensite.

The clay mineral may be hectorite, and a mass ratio of the clay mineral to the solvent may be 1.25% or more and 2.5% or less.

Accordingly, the present invention makes it possible to provide the anti-vibration material having excellent high-temperature durability and dispersibility.

DETAILED DESCRIPTION OF THE INVENTION

Hereinafter, embodiments of the present invention will be described.

An anti-vibration material of the present embodiment is used in engine mounts. Specifically, the anti-vibration material of the present embodiment is encapsulated in a liquid chamber of an engine mount, thereby achieving an anti-vibration effect.

The anti-vibration material of the present embodiment contains a clay mineral and a solvent. The solvent contains water and a polyhydric alcohol having a molecular weight of 106 or less. If a polyhydric alcohol has a molecular weight exceeding 106, its water solubility is reduced, and the viscosity of the solvent becomes higher.

Examples of polyhydric alcohol having a molecular weight of 106 or less include, but are not particularly limited to, ethylene glycol, propylene glycol, diethylene glycol, glycerin, etc. Among these, diol is preferable, and ethylene glycol is particularly preferable, in terms of high-temperature durability of the anti-vibration material of the present embodiment.

The polyhydric alcohol content in the solvent is 35% by mass or more and 55% by mass or less, and preferably 45% by mass or more and 55% by mass or less. If the polyhydric alcohol content in the solvent is less than 35% by mass, the boiling point of the solvent decreases, and the high-temperature durability of the anti-vibration material is reduced. If the polyhydric alcohol content exceeds 55% by mass, an absolute value of the zeta potential of the anti-vibration material decreases, and the dispersibility of the anti-vibration material is reduced. For example, the solvent that has an ethylene glycol content of 35% by mass or more has a boiling point of 105° C. or higher at 760 mmHg. At the temperature at which the engine mount is used, the anti-vibration material does not boil, so that it has enhanced high-temperature durability. If the polyhydric alcohol content in the solvent is 45% by mass or more, the freezing temperature of the solvent decreases, and thus the anti-vibration material of the present embodiment has enhanced low-temperature operability.

Examples of clay minerals include, but are not limited to, montmorillonite, saponite, sepiolite, hectorite, stevensite, magadiite, hydrotalcite, kaolinite, halloysite, and the like. Two or more of them may be used in combination. Among these, hectorite and/or stevensite are preferable, and hectorite is particularly preferable, in terms of dispersibility of the anti-vibration material of the present embodiment.

Figure 1:
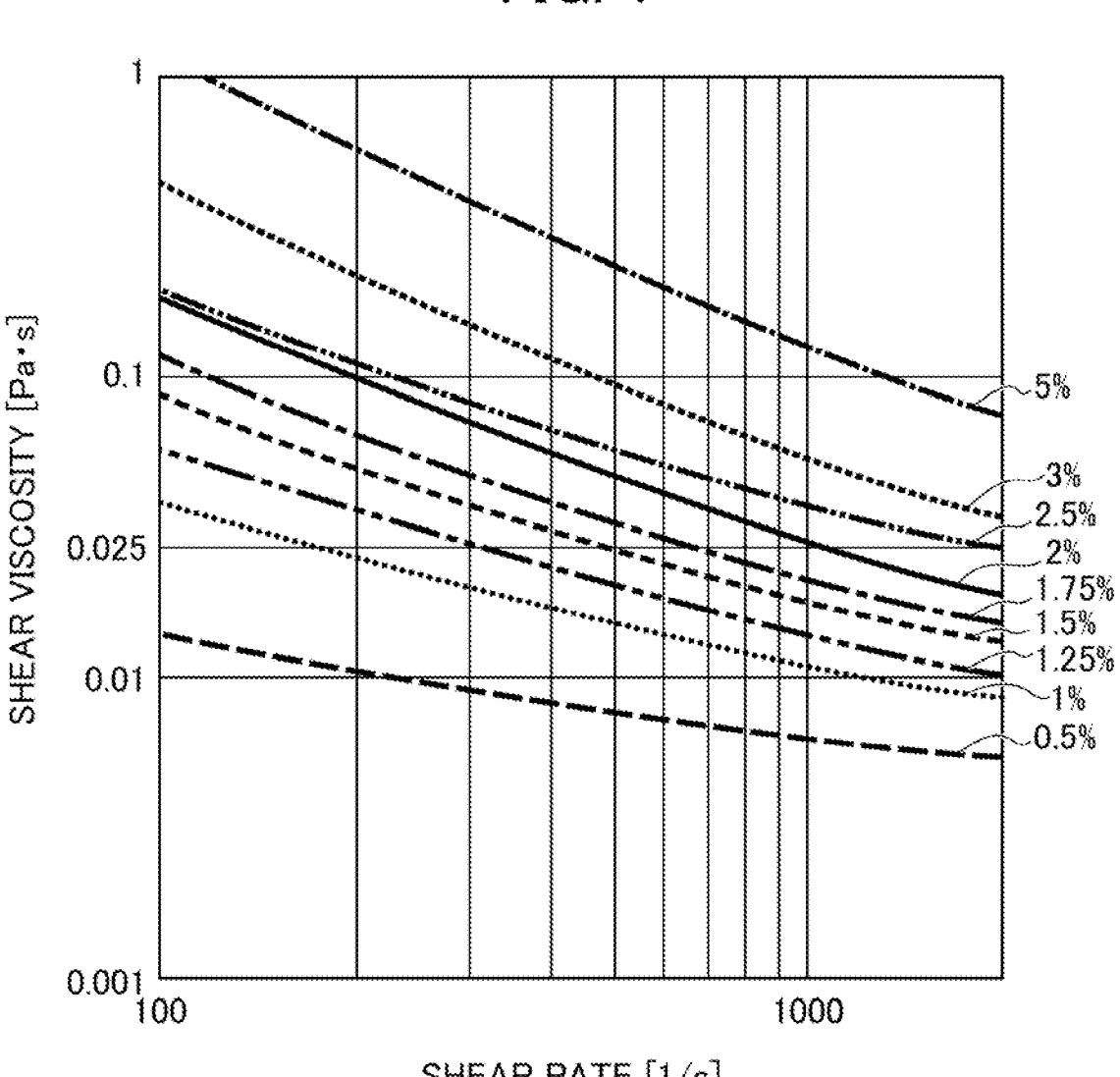
FIG. 1 is a graph showing variations of the relationship of the shear viscosity of an anti-vibration material of the present embodiment to the shear rate thereof, depending on the mass ratio of hectorite to a solvent in the anti-vibration material.

The mass ratio of hectorite to the solvent in the anti-vibration material of the present embodiment is preferably 1.25% or more and 2.5% or less. As shown in FIG. 1, if the mass ratio of clay mineral to the solvent in the anti-vibration material of the present embodiment is 1.25% or more, the shear viscosity of the anti-vibration material of the present embodiment is higher than 0.025 in a lower range of shear rates (between 250 s$^{-1}$ and 600 s$^{-1}$, inclusive) of the anti-vibration material in the liquid chamber of the engine mount.

On the other hand, if the mass ratio of clay mineral to the solvent in the anti-vibration material of the present embodiment is 2.5% or less, the shear viscosity of the anti-vibration material of the present embodiment is lower than 0.025 in a higher range of shear rates (between 750 s$^{-1}$ and 1800 s$^{-1}$, inclusive) of the anti-vibration material in the liquid chamber of the engine mount. Thus, the anti-vibration material of the present embodiment has enhanced anti-vibration effect and improved livability of automobiles.

The anti-vibration material of the present embodiment may further contain pigments, corrosion inhibitors, rust inhibitors, defoamers, pH adjusters, and the like.

Although the embodiments of the present invention have been described above, the present invention is not limited to the above-described embodiments, and various modifications can be made to the above-described embodiments without departing from the spirit of the present invention.

EXAMPLES

Examples of the present invention will be described below, but the present invention is not intended to be limited to the examples.

Example 1

Distilled water and ethylene glycol were mixed at a mass ratio of 55:45, and the mixture was stirred with a stirrer at 200 rpm for 30 minutes at room temperature to produce a solvent. Then, 2 g of Smectone-SWF (manufactured by KUNIMINE INDUSTRIES, Co., Ltd.) as hectorite was added to 100 g of the solvent, and the mixture was stirred at 200 rpm for 180 minutes at room temperature, whereby an anti-vibration material was obtained.

Example 2

An anti-vibration material was obtained in the same way as in Example 1 except that the mass ratio of distilled water to ethylene glycol was changed to 50:50.

Comparative Example 1

An anti-vibration material was obtained in the same way as in Example 1 except that the mass ratio of distilled water to ethylene glycol was changed to 100:0.

Comparative Example 2

An anti-vibration material was obtained in the same way as in Example 1 except that the mass ratio of distilled water to ethylene glycol was changed to 75:25.

Comparative Example 3

An anti-vibration material was obtained in the same way as in Example 1 except that the mass ratio of distilled water to ethylene glycol was changed to 25:75.

Comparative Example 4

An anti-vibration material was obtained in the same way as in Example 1 except that the mass ratio of distilled water to ethylene glycol was changed to 0:100.

[Dispersibility of Anti-Vibration Material]

The zeta potential of the anti-vibration material was measured with an ultrasonic particle size distribution and zeta potential measuring device DT-1202 (manufactured by Dispersion Technology Inc.) on the following conditions to thereby evaluate the dispersibility of the anti-vibration material. At this time, the anti-vibration material was placed in the device immediately after stirring with the stirrer, and the zeta potential of the anti-vibration material was determined as an average value at N=3.

Probe: Colloidal oscillating current CVI probe
Measurement frequency: 1 MHz to 100 MHz
Measurement temperature: 23° C.

Figure 2:
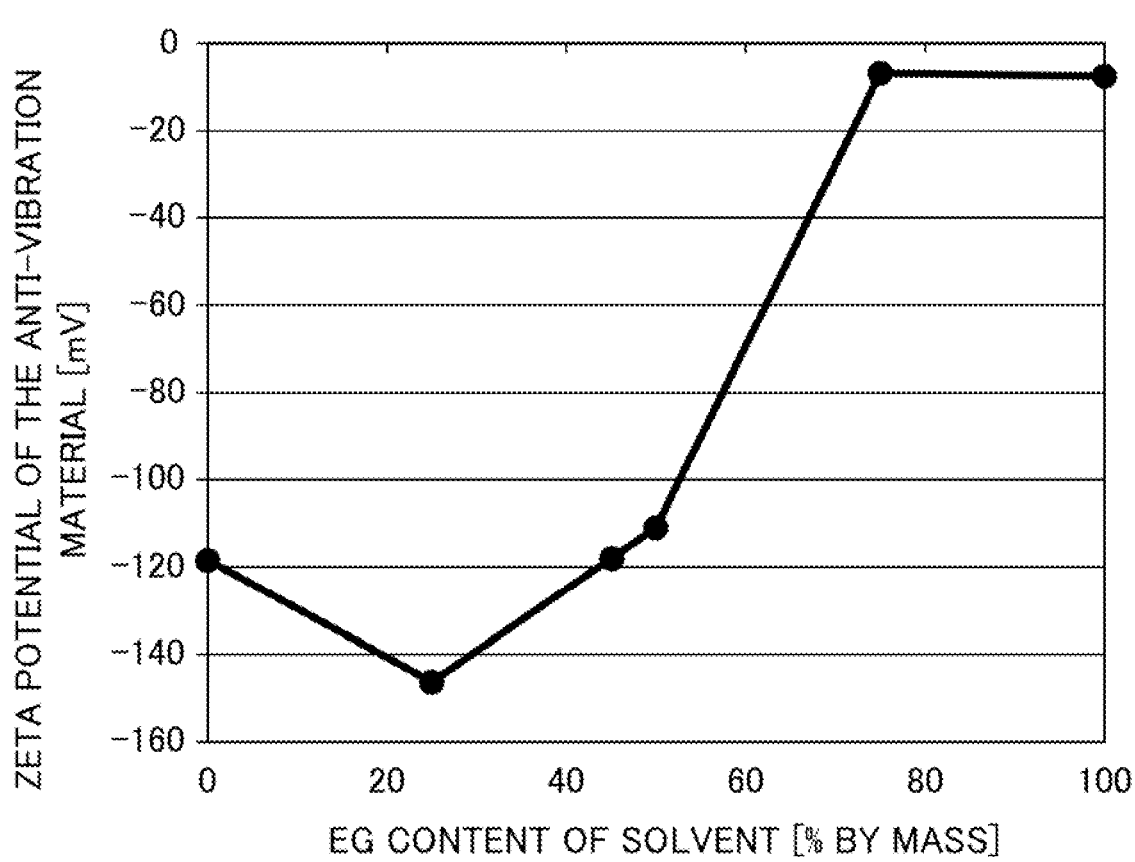
FIG. 2 is a graph showing the relationship of the zeta potential of the anti-vibration material to the ethylene glycol content in the solvent.

FIG. 2 shows the relationship of the zeta potential of the anti-vibration material to the ethylene glycol (EG) content in the solvent.

As can be seen from FIG. 2, the anti-vibration materials of Examples 1 and 2 and Comparative Examples 1 and 2 have an absolute value of the zeta potential of 100 V or more and have high dispersibility. In contrast, the anti-vibration materials of Comparative Examples 3 and 4 have an EG content in the solvent of 75% by mass or more and thus have low dispersibility.

[Freezing Temperature of Solvent]

The viscosity of the solvent when decreasing the temperature of the solvent at a temperature decrease rate of 2° C./min was measured with a cone-plate viscometer MCR 302 (manufactured by Anton Paar) on the following measurement conditions. Then, the freezing temperature of the solvent was determined from the rate of change in the viscosity of the solvent.

Jig: Cone plate φ50
Shear rate: 10 s$^{-1}$
Measurement temperature: 23° C.

At this time, water and each of the ethylene glycol aqueous solutions containing 40% by mass, 45% by mass, and 50% by mass of ethylene glycol were used as the solvent.

Figure 3:
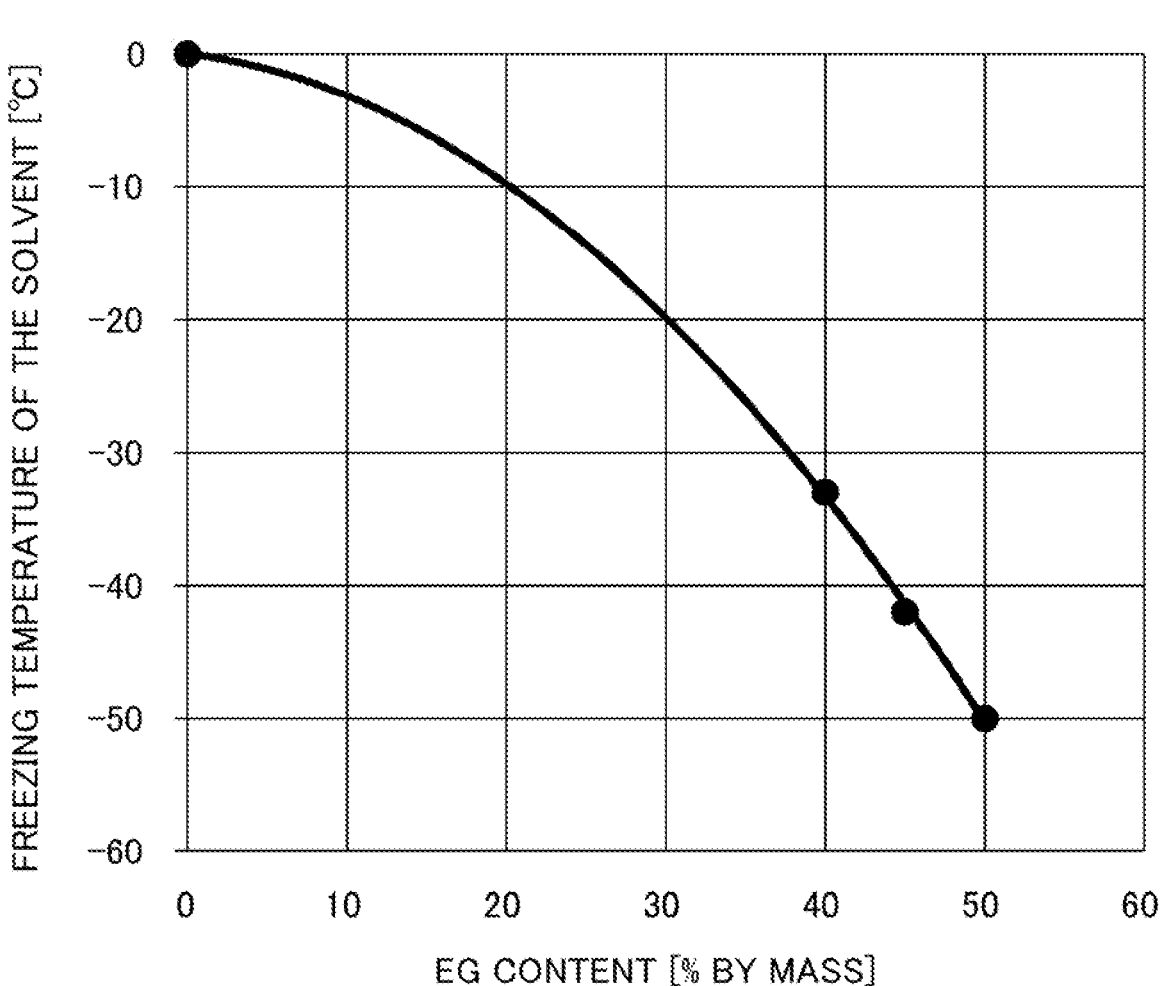
FIG. 3 is a graph showing the relationship of the freezing temperature of the solvent to the ethylene glycol content.

FIG. 3 shows the relationship of the freezing temperature of the solvent to the ethylene glycol (EG) content.

As can be seen from FIG. 3, if the EG content is 45% by mass or more, the freezing temperature of the solvent becomes lower than −40° C., and the anti-vibration material does not freeze at the temperature at which the engine mount is used and has enhanced low-temperature operability.

What is claimed is:

1. An anti-vibration material used in an engine mount, comprising:
   a clay mineral; and
   a solvent,
   the clay mineral being hectorite,
   the solvent containing water and a polyhydric alcohol having a molecular weight of 106 or less, wherein the solvent has a polyhydric alcohol content of 45% by mass or more and 55% by mass or less,
   a mass ratio of the clay mineral to the solvent being 1.25% or more and 2.5% or less.

* * * * *